US008595090B2

(12) United States Patent
Lau et al.

(10) Patent No.: US 8,595,090 B2
(45) Date of Patent: *Nov. 26, 2013

(54) UNIVERSAL USER INTERACTION MODULE FOR WEB TRANSACTIONS WITH USER CONTROLLED CONDITIONS

(75) Inventors: Alex Lau, Markham (CA); Jin Li, Markham (CA); Jimmy Lo, Scarborough (CA); Joanna W. Ng, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,271

(22) Filed: Apr. 25, 2012

(65) Prior Publication Data

US 2013/0073424 A1 Mar. 21, 2013

Related U.S. Application Data

(63) Continuation of application No. 13/233,721, filed on Sep. 15, 2011.

(51) Int. Cl.
*G06Q 30/00* (2012.01)
(52) U.S. Cl.
USPC ............... 705/26.8; 705/26.81; 705/27.1

(58) Field of Classification Search
USPC ............................................. 705/26.1–27.2
See application file for complete search history.

(56) References Cited

U.S. PATENT DOCUMENTS

| 7,778,882 | B2 | 8/2010 | Chatter et al. | |
| 2009/0254447 | A1* | 10/2009 | Blades | 705/26 |
| 2009/0307106 | A1* | 12/2009 | Gupta et al. | 705/26 |

OTHER PUBLICATIONS

Frost, D., Goode, S., & Hart, D. (2010). Individualist and collectivist factors affecting online repurchase intentions. Internet Research, 20(1), 6-28. doi:http://dx.doi.org/10.1108/10662241011020815.*

* cited by examiner

*Primary Examiner* — Resha Desai
(74) *Attorney, Agent, or Firm* — Cantor Colburn LLP; Ed Choi

(57) ABSTRACT

A universal user interaction module for web transactions with user controlled conditions. A request is received from a user to begin an order. User information is collected from one or more data repositories. The user information is consolidated and a determination is made as to what additional data is required to complete the order. The additional data is requested from the user and is received from the user. The additional data includes one or more user conditions for placing the order. The order is then stored. The order for the product includes the one or more user conditions, and the order is placed only after all of the one or more user conditions have been met.

6 Claims, 3 Drawing Sheets

UNIVERSAL USER INTERACTION MODULE FOR WEB TRANSACTIONS WITH USER CONTROLLED CONDITIONS

CROSS-REFERENCE TO RELATED APPLICATION

This application is a continuation of U.S. patent application Ser. No. 13/233,721, filed Sep. 15, 2011, the disclosure of which is incorporated by reference herein in its entirety.

BACKGROUND

This invention relates generally to processing within a computing environment, and more particularly to universal user interaction module for web transactions with user controlled conditions.

Much of today's content and functions on the web must be custom programmed to be consumable by end users. The typical user interaction model is for synchronous web transactions. Currently, when users invoke an action to initiate a web transaction, the initiation of the transaction must start immediately. The web transaction cannot be a long running process and must respond within certain timeframes per the HTTP protocol. There is no capability to allow users to schedule the start of a Web transaction based on time or conditions, or to start a long running web transaction on their behalf. In addition, the user interaction model for today's web transactions is inconsistent and requires custom coding for each different web transaction data type.

BRIEF SUMMARY

An embodiment includes a computer implemented method for implementing a universal user interaction module for web transactions with user controlled conditions. The method includes receiving a request from a user to initiate an order. Upon receipt of the request, user information is collected from one or more data repositories. The user information is consolidated and a determination is made as to what additional data is required to complete the order. The additional data is requested from the user and is received from the user. The additional data includes one or more user conditions for placing the order. The order is then stored. The order for the product includes the one or more user conditions, and the order is placed only after all of the one or more user conditions have been met.

Another embodiment includes a method, for implementing a universal user interaction module for generating a user interface for web transactions with user controlled conditions. The method includes receiving a data definition; the data definition includes a plurality of required data fields. User interface code is generated, the user interface code including one or more input fields, the one or more input fields corresponding to the plurality of required data fields. The user interface code is transmitted to a user. Product order data corresponding to the plurality of required data fields is received. The product order data is validated against the data definition. If it is determined that the product order data is valid, the product order data is stored as an order for a product, the order for the product includes the one or more user conditions. The order for the product is placed only after all of the one or more user conditions have been met.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
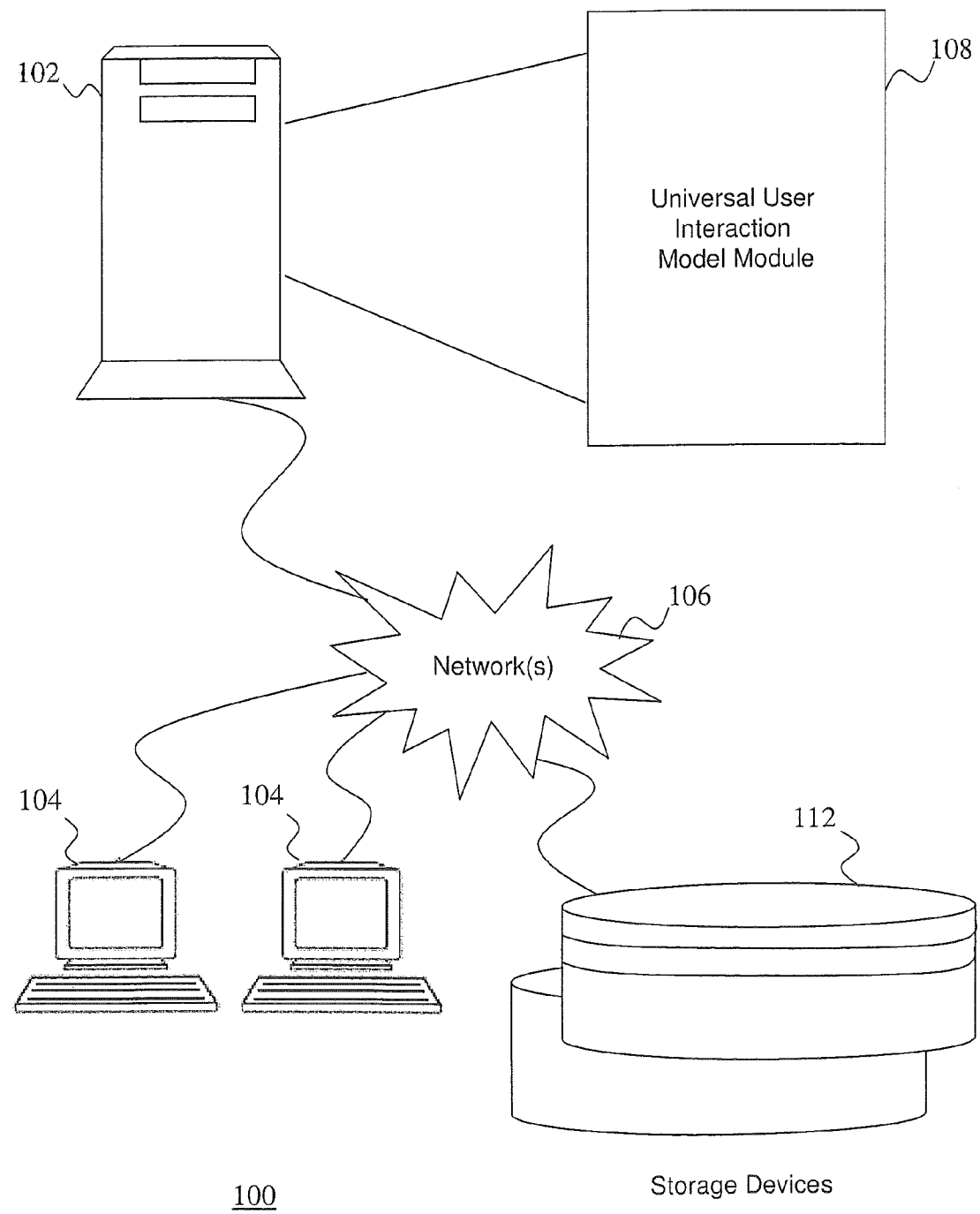
FIG. 1 depicts a schematic diagram of a system for implementing a universal user interaction module for web transactions with user controlled conditions in an embodiment.

An embodiment of the present invention implements a universal user interaction module for web transactions with user controlled conditions.

In an embodiment, a user interface is generated based on a data definition, and is presented to a user. The interface is incorporated into a website order process and allows for the creation of orders that are fulfilled asynchronously based on conditions specified by a user. The data is input by the user and is combined with other previously saved user data to fulfill the order when the user's conditions are met.

In an embodiment, the user may request a confirmation after the conditions have been met, but before the order is placed, or may allow the system to place the order automatically when the conditions have been met. The user may also place a recurring order by specifying the frequency of the order along with the conditions.

Because the user interface is generated based on a data definition, the user interface can be implemented quickly and within an existing order flow.

Traditionally, in order to allow users to purchase a product only when a certain condition such as price is met, websites provide an "Add to Price Watch" or "Add to Watch List" action. Users are then left to their own devices to monitor the condition and act on it. That is, when the condition is met, users need to read the notification and manually go back to the website to purchase the product. If the condition is time sensitive, users will need to rely on random luck to complete the web transaction.

In some instances, a user is required to upload data as part of an order (e.g., a photo order, which requires users to upload photos before placing the order.) In these cases, a user is required to wait an extended period of time while the data is uploaded. The user experience would be enhanced if users could quickly specify the data to upload based on a subset of the data, or other data indicators, start the web transaction and let the web application complete the full upload of all of the data and place the order when the upload is complete. Users would then be freed from waiting hours to upload all of the data (e.g., high resolutions in a photo order) to the site before they can specify what order they would like to place.

In traditional web applications, because ordering mechanisms are customized for each site, there are inconsistencies between various user interaction models for a "purchase" action (e.g., "Pre-Order", "Add to Cart" and "Rent Now".) For the emulated conditional purchase action, there are inconsistencies as well (e.g., "Add to Price Watch", "Add to Watch List," etc.) Each of these web transaction data types, such as a camera or a movie, requires custom coding.

An embodiment provides for users to schedule the start of a web initiated transaction based on user controlled conditions. An additional embodiment allows users to start a long running web transaction on the user's behalf. A universal user interaction model is provided for back-end application developers to define the presented unit of function for various web initiated transaction data types. This functionality is provided without custom coding on a per function, or per data type basis.

In an embodiment, a user's shipping and billing information is previously stored in the back-end system. When a user selects the order button, the user is not prompted for this information, instead the information is retrieved from the backend. As a result, the user is only prompted for conditional parameters specific to the executing of the web initiated transaction.

In an embodiment, there are three categories of parameters requested from the user. The first are the simple required parameter input for this order, such as, for example, a quantity of the order (i.e., how many of the selected item does the user want to order). The second category is the conditions for executing the order. These conditions include, for example, the price at which to execute the order. The third category is the when to execute the order, for example, synchronously (i.e., initiate the order right away), or asynchronously (i.e., schedule initiation of the order at a later time.) In an embodiment, a user additionally selects if the order is to be repeated.

In an embodiment, a condition may be a simple value threshold, or a complex object with Boolean expressions. The user may choose if they want to confirm the order once the condition has been met, or if the condition will automatically initiate the order without additional confirmation after it has been met.

Turning now to FIG. 1, a system 100 for implementing a universal user interaction module for web transactions with user controlled conditions will now be described. In an embodiment, the system 100 includes a host system computer 102 executing computer instructions for implementing a universal user interaction module for web transactions with user controlled conditions. Host system computer 102 may operate in any type of environment that is capable of executing a software application. Host system computer 102 may comprise a high-speed computer processing device, such as a mainframe computer, to manage the volume of operations governed by an entity for which the implementing a universal user interaction module for web transactions with user controlled conditions is executing. In an embodiment, the host system computer 102 is part of an enterprise (e.g., a commercial business) that implements the implementing a universal user interaction module for web transactions with user controlled conditions.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the universal user interaction module for web transactions with user controlled conditions described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of implementing a universal user interaction module for web transactions with user controlled conditions. Alternatively, a separate storage device (e.g., storage device 112) may be implemented for this purpose.

In an embodiment, the storage device 112 includes a data repository with data relating to a universal user interaction module for web transactions with user controlled conditions by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., system data and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the universal user interaction module for web transactions with user controlled conditions. The host system computer 102 includes a universal user interaction model module 108. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the universal user interaction module for web transactions with user controlled conditions described in FIG. 1 may be implemented in hardware, software executing on a general purpose computer, or a combination thereof.

In an embodiment, in order to implement a universal user interaction module for web transactions with user controlled conditions, website developers define user interface code, such as the following markup in the HTML file for the "Order" action on a product data object:

```
         <div typeof="roh:ARLink">
         <div property="roh:hasAction">Order</div>
         <div rel="roh:hasTargetInterface">
         <div typeof="roh:InterfaceReference">
         <div rel="roh:referencesInterface">
a.       <div typeof="roh:Create">
b.       <div property="roh:hasMapping" dataType="rdf:XMLLiteral">
c.       <map:MappingRoot>
i.       <input path="#me"/>
ii.      <output path="camera.xsd"/>
iii.     <mapping>
iv.      <assign value="Canon EOS Rebel T2i">
v.       <output path="CameraName"/>
vi.      </assign>
vii.     <assign value="829.99">
viii.    <output path="Price"/>
ix.      </assign>
x.       </mapping>
d.       </map:MappingRoot>
e.       </div>
f.       </div>
         </div>
         <div rel="roh:referencesResource"
         href="http://www.my_web_store.com/order_camera.roh"/>
         </div>
         </div>
         </div>
```

The "roh:hasAction" indicates the action that is available for the camera product object instance. In this example, "Order" is the label for the action. In addition, the "roh: hasMapping" lists all the simple required data input for this order. These parameters are collected and consolidated via linked data starting with order_camera.roh. Input parameters that have known values are encoded in this markup already, any parameters that do not have mapped values will be added in the "Order" button UI prompt as will be described in more detail below. The related link "roh:referenceResource" is the starting point for linked data traversal to find all required data input to initiate this order.

In an embodiment, the input form is created based on data that is provided by an XML schema document (XSD) such as:

```
<xsd:schema targetNamespace="http://test_namesapce"
xmlns:xsd=http://www.w3/prg/2001/XMLSchema>
<xsd:complexType name="camera.xsd">
<xsd:sequence>
<xsd:element minOccurs="0" name="CameraName" type="xsd:string"/>
<xsd:element minOccurs="0" name="Price" type="xsd:double/>
</xsd:sequence>
</xsd:complexType>
</xsd:sxhema>
```

The "Price" parameter is marked as a variable value field in the XSD, which means the value for "Price" may change over time. Therefore, "Price" will be shown as a conditional field in the UI prompt. The price parameter is used as a non-limiting example for purposes of clarity. In embodiments, the transaction conditions are declarative, and new conditions may be added by simply configuring the backend to add additional parameters to the XSD file. The additional parameters in the XSD file will cause the HTML file to dynamically change to include the additional parameters as condition options.

The schema in this example is for a camera product. There are two data elements that describe the camera product and are required to create an order for a camera. These fields will be mapped to a GUI, as will be described in more detail below, and with those fields there is enough information to initiate an order on user's behalf.

In an embodiment, a specialized JavaScript client code is used to process this markup to bring up a UI prompt and send the request to the back-end application when users hit the "Submit" button.

Figure 2:
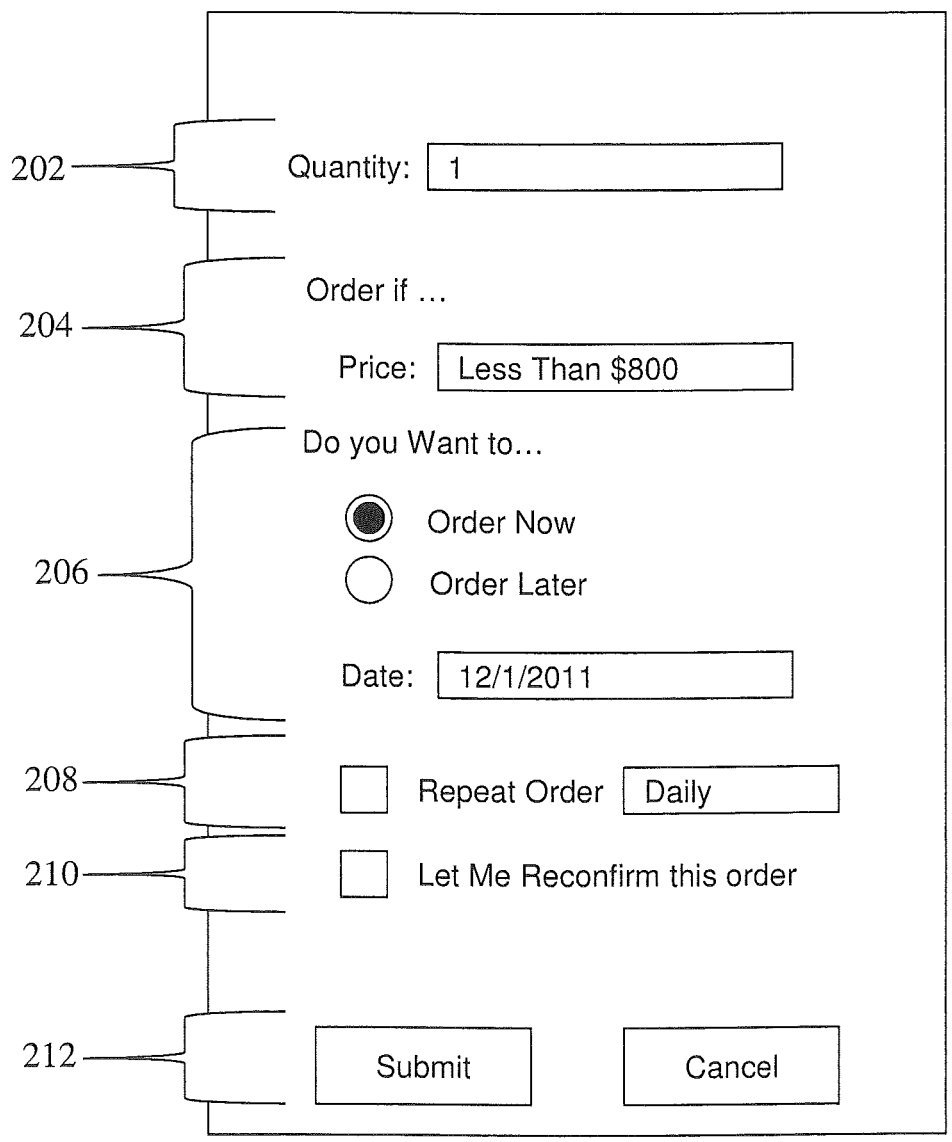
FIG. 2 depicts a schematic diagram of an example unified order input mechanism in an embodiment.

FIG. 2 depicts a schematic diagram of an example unified order input mechanism in an embodiment. The input mechanism of FIG. 2 may be implemented, for example, in a web browser using code, or a data provided by a data definition document, such as an XSD retrieved from the universal user interaction model module 108 of FIG. 1. In an alternate embodiment, the input mechanism of FIG. 2 is implemented as embedded code on a web page. The input mechanism includes one or more simple input parameters 202. The simple input parameters 202 include the quantity or number of the specific item that a user wishes to order. The simple input mechanism additionally includes execution conditions 204. The execution conditions 204 may includes a price condition, as shown, or any other condition for executing the order. In an embodiment, the execution conditions 204 may include conditions such as when the price reaches a 52 week low, or when the market price drops more than 10%. The conditions are specified at the backend without requiring code changes to the front end application, and are dynamically added to the front end user interface for entry by the user. The input mechanism additionally includes a processing time option 206. The options include a synchronous "order now" option, and an asynchronous "order later" option. The "order later" option may include a date after which the order will be processed. In an embodiment, an order that is typically processed synchronously is configured to process asynchronously by adding a condition to the order. The fulfillment of the condition typically takes place in a point in time in the future. In an embodiment, the date may be used in conjunction with the price condition, or as the only condition.

The input mechanism additionally includes a repeat order option 208. The repeat order option 208 allows a user to select if an order is to be repeated, and if so, the frequency. In an embodiment the frequency may be any temporal frequency (i.e. every hour, every day, weekly, monthly, quarterly, etc.). In addition, the input mechanism may include an option to reconfirm the order 210. The option to reconfirm the order 210 allows a user to choose to be notified once all of the conditions have been met, and requires the user to reconfirm the desire to make the order prior to placing the order. If a user chooses not to reconfirm the order, then the order is placed automatically once the conditions have been met.

In addition, the input mechanism has action buttons 212. The action buttons 212 include a submit button, which submits the user's input to the universal user interaction model module 108 for processing. The action buttons 212 also include a cancel button to stop the current ordering process.

The input mechanism of FIG. 2 is simplified for clarity and it will be understood that other implementation options are possible. Although FIG. 2 depicts an embodiment of an input mechanism, it will be understood that other input mechanisms may be used to input the order information. Other embodiments include more or fewer inputs. Additional embodiments allow the input fields for the various parameters to be embedded in a product page, or to be a standalone browser pop-up window. Further embodiments include a web service for transmitting a user's options directly to the universal user interaction model module 108 without requiring a windowed implementation.

In an embodiment, the fields of the input mechanism are generated according to a data definition, such as the XSD described above. Any data that is required by the XSD that is not available from other sources is added as a field in the input mechanism of FIG. 2.

Figure 3:
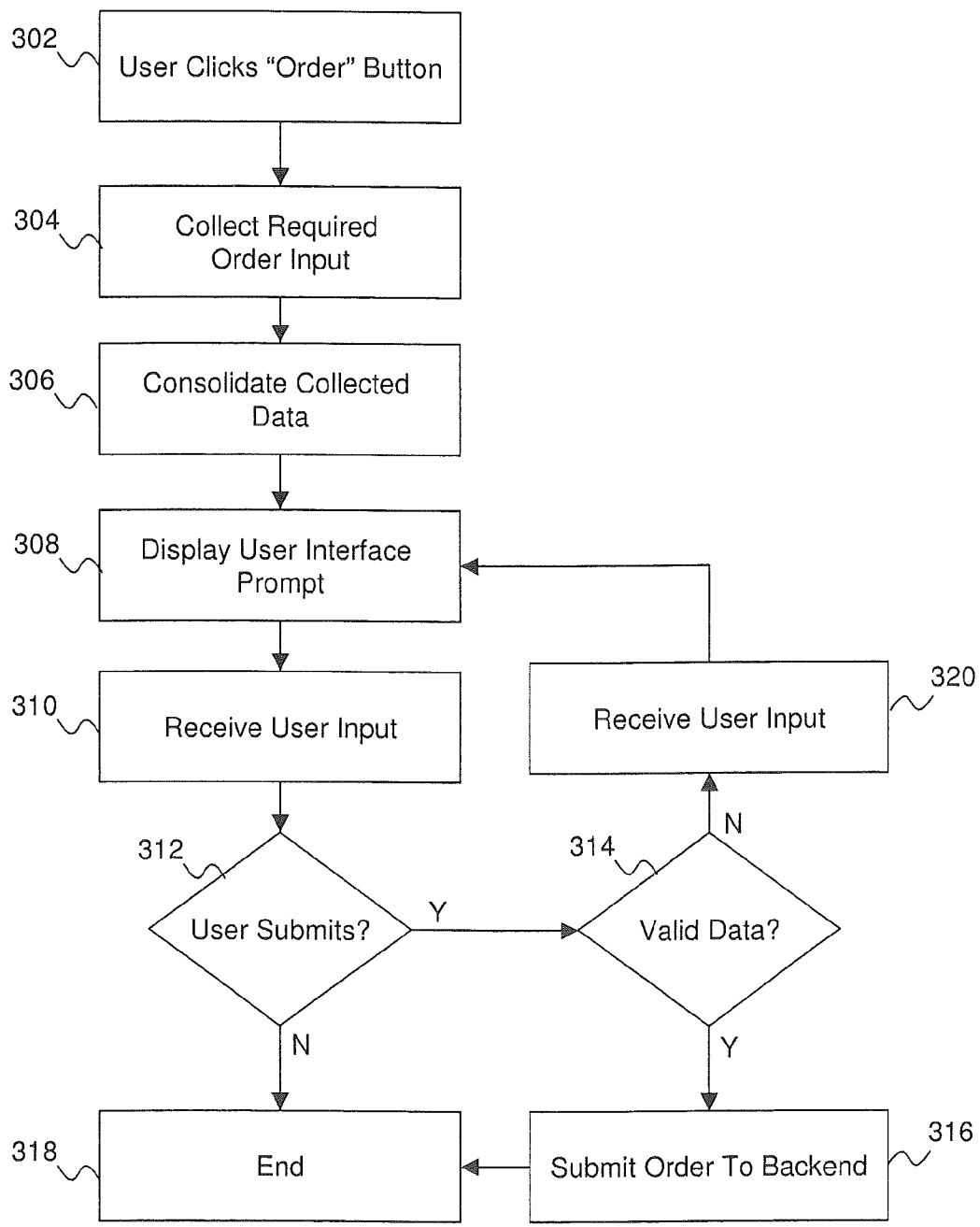
FIG. 3 depicts a process flow that may be used to implement a universal user interaction module for web transactions with user controlled conditions in an embodiment.

FIG. 3 depicts a process flow that may be used to implement a universal user interaction module for web transactions with user controlled conditions in an embodiment. At block 302, a user clicks on an "order" button on, for example, a product page in a web browser. At block 304 the required input is collected. The required input may include a user's billing and shipping information collected from a backend system such as a merchant data repository, a user registration database, and/or a centralized user database. In an embodiment, the centralized user database may be implemented to collect user data that can be used across a number of websites that implement the universal user interaction module 108. The input may additionally include product information, and order information such as available parameters for user controlled conditions. In an embodiment, the input may be retrieved from disparate systems. At block 306, all of the collected data is consolidated. At block 308, a user interface, such as the input mechanism of FIG. 2 is displayed to the user, and the user is prompted for input. At block 310, the user's input is received at the universal user interaction model module 108 of FIG. 1. At block 312, it is determined if the user has submitted the data, or canceled the transaction.

If the user has submitted the data, then processing continues at block 314 where the data is validated. If the data is valid, then processing continues at block 316. At block 316, the order is submitted to the backend for synchronous or asynchronous processing depending on the options provided to, or selected by the user. At block 318, processing ends. Returning to block 314, if the data is not valid, then the user is prompted to correct the errors at block 320. Processing then continues at block 308 where the user is prompted to input corrected data. Returning to block 312, if the user cancels the order, then processing ends at block 318 without an order being placed or submitted.

Technical effects and benefits include providing users the ability to interact with a presented unit of functionality synchronously or asynchronously to carry out one or more web transactions. An additional benefit includes a universal user interaction model for back-end application developers to use to define the presented unit of function for various web transaction data types, without custom coding of each. Further embodiments include user specified conditions for a web transaction using a unified user interface. Yet another benefit is the ability to allow back-end developers to expose Web transaction conditional parameters declaratively, without new custom coding for each data type. An additional benefit is the ability to present end users with a consistent user interface for web transactions, wherein the contents of the user interface dialog prompt are filled dynamically with requiring custom coding to add and/or remove conditional parameters. A further benefit is allowing end users to invoke web transactions synchronously or asynchronously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method, comprising:
receiving, on a computer, a request from a user to initiate an order, the request including a frequency command for repeating the order based on a selected time period;
collecting, on the computer, user information from one or more data repositories;
consolidating, on the computer, the user information;
determining, on the computer, what additional data is required to complete the order;
requesting, on the computer, the additional data from the user;
receiving, on the computer, the additional data from the user, the additional data including one or more user conditions for placing the order and a specified date indicating a future point in time selected by the user;

storing the order for a product, the order for the product including the one or more user conditions;

initiating a long-running asynchronous ordering process that commences no earlier than the future point in time without intervention from the user;

placing the order for the product at the future point in time, the order placed automatically only after all of the one or more user conditions have been met without intervention from the user; and repeating the initiating the long-running asynchronous ordering process according to the frequency command.

2. The method of claim 1 wherein the one or more user conditions are optional.

3. The method of claim 1, wherein the determining comprises comparing the user information to a data definition of data fields required in order to complete the order.

4. The method of claim 3, wherein the data definition of data fields comprises an XML schema document.

5. The method of claim 1, wherein the user is required to confirm the order before the order is placed.

6. The method of claim 1, wherein the one or more user conditions are added at a backend system and are requested from the user dynamically without additional coding.

* * * * *